March 15, 1955 C. W. LANTZ ET AL 2,704,010
MULTIFOCAL LENS AND METHOD OF MAKING THE SAME
Filed March 10, 1952 2 Sheets-Sheet 1
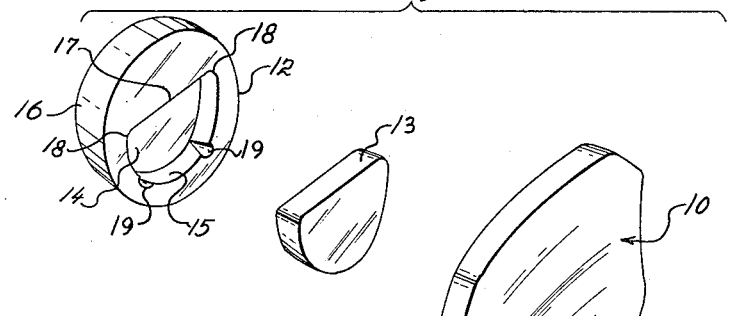
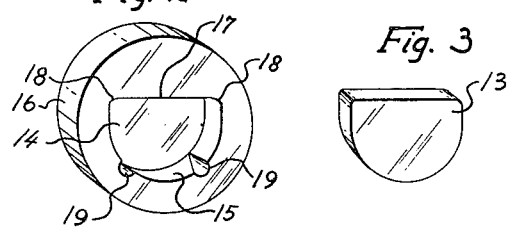
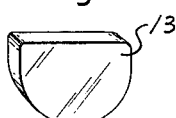
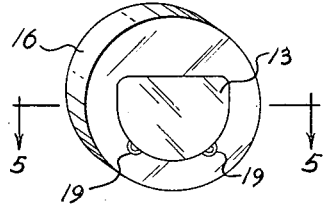
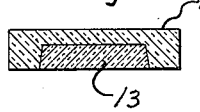
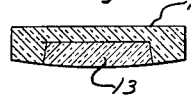
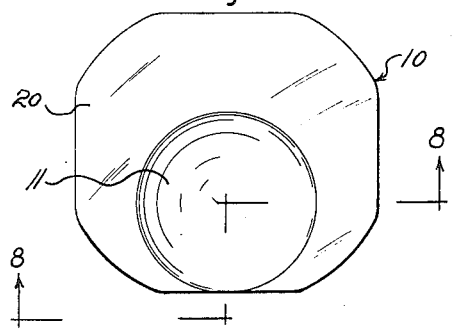
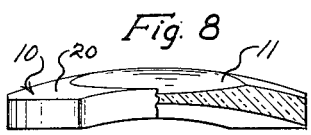
INVENTORS
CLAIR W. LANTZ
MARCUS B. POWELL
BY Williamson, Williamson, Schroeder & Adam
ATTORNEYS

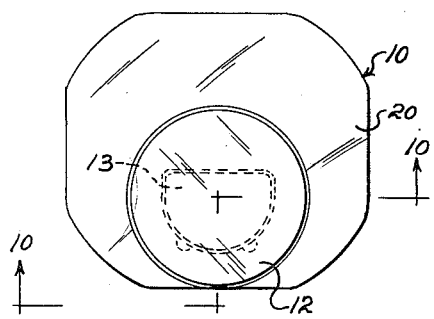
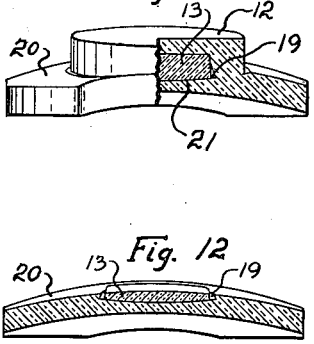
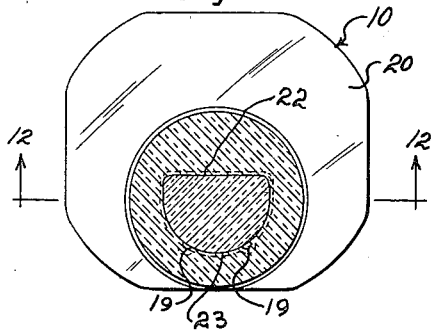
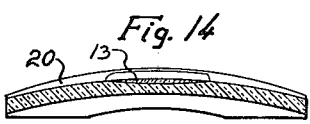
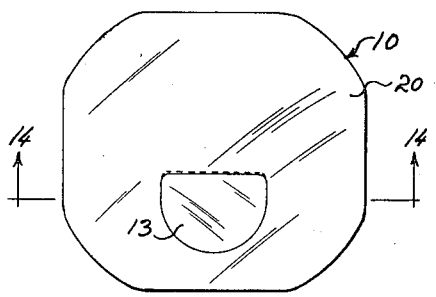
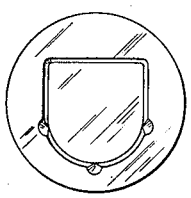
INVENTORS
CLAIR W. LANTZ
MARCUS B. POWELL United States Patent Office 2,704,010
Patented Mar. 15, 1955

2,704,010

MULTIFOCAL LENS AND METHOD OF MAKING THE SAME

Clair W. Lantz, St. Cloud, and Marcus B. Powell, Minneapolis, Minn., assignors, by direct and mesne assignments, of one-half to said Lantz, and one-half to Precision-Cosmet Company, Inc., Minneapolis, Minn., a corporation of Minnesota Application March 10, 1952, Serial No. 275,774

2 Claims. (Cl. 88—54)

This invention relates to multifocal lenses such as are used in the manufacture of eye glasses and more particularly to the manufacture of a semi-finished opthalmic blank having a minor lens disposed within a major lens, and including as well a novel method for the precise structural formation of such an opthalmic blank.

It is a principal object of this invention to provide for a method of manufacture of multifocal lens blanks wherein self-contained depth gauge means furnish a measure of the precise depth to which the composite outer surface of the multiple lenses should be ground.

It is a further object of the invention to provide for a method of manufacture of an opthalmic blank of the class described in which a self-contained visual surface facet lateral to the composite blank surface will determine during grinding the required orientation adjustment of the blank as well as the final depth of the grind at the conclusion of the grinding process.

It is another object of this invention to provide for a novel intermediate product formed in the practice of my method for making multifocal lenses in which a precison ground surface of an optical button contained within a carrier is fixed to the surface of a major optical blank to form an article having a self-contained depth gauge and is adapted to be ground at the surface thereof for the completion of the multifocal lens blank.

It is a further object to provide for a completed multifocal lens blank in which the top edge of the intersurface between a minor lens and the major lens is substantially a straight line for minimum distortion of the wearer's view while shifting his line of vision vertically, and in which the bottom edge of said interface has a feather edge defining a curved locus which extends upwardly to join with the top edge in a natural curve at each side approximating the projected curvature of the pupil of the eye for maximum vision through the minor lens with minimized distortion at the unions of said major and minor lenses.

It is a still further object of this invention to provide for a high quality precise lens blank and for a simple and efficient method of maintaining precise construction thereof during its manufacture.

These and other objects and advantages of our invention will more fully appear from the following description made in connection with the accompanying drawings wherein like reference characters refer to similar parts throughout the several views and in which:

Fig. 1 is an exploded view of the button carrier, the segment button and the major optical blank in the relative positions ultimately assumed when they are assembled;

Fig. 2 is a perspective view of our button carrier with faceted areas formed in the side walls of the recessed portion;

Fig. 3 is a perspective view of our segment button;

Fig. 4 shows a perspective view of the button carrier with the segment button secured thereto to form the minor blank;

Fig. 5 is a cross section of the minor blank taken on the lines 5—5 of Fig. 4;

Fig. 6 is a vertical section of the same minor blank shown in Fig. 5 after precison grinding of the composite surface thereof;

Fig. 7 is a plan view of the major blank showing the concave precison ground area at the outer surface thereof;

Fig. 8 is a partial vertical section of the major blank taken on the lines 8—8 of Fig. 7;

Fig. 9 shows a top view of the intermediate product comprising the combined major blank and minor blank in fused relation;

Fig. 10 is a partial vertical section of the intermediate product taken on the lines 10—10 of Fig. 9;

Fig. 11 shows the intermediate product with the boss portion ground off and the faceted surfaces still remaining;

Fig. 12 is a vertical section of the partially ground blank shown in Fig. 1 and taken on the line 12—12 thereon;

Fig. 13 shows a bifocal lens blank with the outer surface thereof completely ground to precise formula with the facet;ed depth-gauging surfaces ground away;

Fig. 14 is a vertical cross section of the completed lens blank shown in Fig. 13 and taken on the lines 14—14;

Fig. 15 is a plan view of a button carrier with three off-set facet surfaces; and Fig. 16 shows a segment button for a tri-focal blank.

Referring more particularly to the drawings, the major blank 10 as shown in Figs. 1 and 7 is molded in a general rectangular shape with a slight curvature throughout as is common in the art of forming opthalmic blanks. The major blank is constructed of a clear material such as spectacle crown glass having a clearly defined index of refraction and a high degree of transparency. It is understood, of course, that throughout this specification various other forms of optical material may be employed, including transparent plastic material, but the preferred substance which we use is the optical glass first mentioned.

As is common in the preparation and treatment of major lens blanks the blank 10 has formed at the convex surface thereof a concave precison ground area 11 as seen in Fig. 7. This area is ground to precise formula although it is not important that the depth be gauged to the exact quantity at this portion of the process. The blank 10 is then laid to one side while the minor blank is constructed. The minor blank comprises a button carrier 12 and a segment buton 13. The button carrier 12 is preferably formed of the same optical material as the major blank 10, having substantially the same refractive index so as to have no optical interface when the two parts are secured or fused together. The segment button 13 is likewise constructed of optical material such as flint glass having a refractive index different from that of the button carrier 12 and the major blank 10. In the formation of the button carrier 12 a block of substance such as the spectacle crown glass above mentioned is brought to a softened condition. An instrument such as a die press forms a segmental recess 14 within the body of the carrier 12. The recess 14 has a well defined smoothly curved side wall 15 which follows to some degree the outside curvature 16 of the carrier and has a substantially straight portion 17 joining the curved portion in rounded corners 18 as shown in Figs. 1 and 2. The side wall 15 of the recessed portion may be slightly tapered toward the bottom thereof so as to facilitate the withdrawal of the die when the recess 14 is formed. Simultaneously with the formation of the recess or independently thereof, one or more off-set facet areas 19 are formed at a small area of the total wall area 15. In practice we form this facet area so as to extend for most of the entire depth of the wall 15 for a purpose which will be enlarged upon further in this specification. The segment button 13 is shaped to conform to the recess 14 and to substantially fill the opening with the outer surfaces thereof concurrent when secured together. In order to secure the segment button to the button carrier, we may apply heat sufficient to bring the contacting surfaces thereof to incipient melting condition whereby the surfaces will become fused and the button 13 securely attached to the carrier 12. Fig. 4 illustrates the fused combination of the button 13 with the carrier 12 to form a minor blank as shown. The segment button 13 may flow to some degree into the faceted off-sets 19 and may even completely fill the off-set portion it being understood that the difference in the refraction indices of the button 13 and the carrier 12 will maintain a visually faceted interface which will be clearly visble through the transparent optical material. The appearance of the fused segment button 13 and the button carrier 12 to form the minor blank is shown in cross section in Fig. 5.

The minor blank is then ground with a lens surface as shown in Fig. 6 which surface has a precise optical formula corresponding to the contour of the ground area 11 in the major blank 10 as shown in Fig. 7. Following precision grinding of the minor blank the two blanks are brought together with their precison ground surfaces in contact and heat is applied so as to fuse the two blanks together. The intermediate product thus formed appears from the top as in Fig. 9. It will be observed that following the fusion the minor blank is in inverted position and the button carrier portion has become integral with the major blank 10. Thus the assembly appears as an optical blank having an outer convex surface 20 with a raised boss portion formed from the button carrier 12 with the interface therebetween completely obliterated in the fusion process. The segment button 13, however, being of an entirely different refractive index, remains as a visible entity imbedded within the assembly and having its optical interface 21 preserved. It is understood of course that the fusion process is not carried out at such a high temperature as will cause the interface 21 to warp or otherwise become distorted. During the fusion process the off-set facet surface 19 may have become filled with molten glass or may have, to some degree at least, preserved a hollow shape. In any event a facet surface is maintained, the difference in refractive indices between the two types of glass or between one type of glass and the air in the off-set portion constituting a light reflecting surface. It should be noted that the off-set facet surface exactly terminates at the optically precise interface 21 and no part of the facet surface extends below the interface or its projected plane. Fig. 10, at the vertical section portion, shows this relation between the facet surface and the interface.

Following the fusion of the major and minor blanks the boss portion constituting the greater part of the button carrier 12 is ground away until a surface is formed which is substantially coextensive with the surface 20 of the major blank 10. This rough grinding is accomplished at a relatively high rate of speed by mechanical means such as a diamond cup generator. The intermediate product is held in a jig or form without clamping therein and the optical material is rocked relative to the cup thus generating a spherical surface. The radius of the rocking motion determines the rate of curvature of the ground surface. However, because of the rapid curve generation and the roughness of the cutting it becomes desirable to finish the grinding in a slower and more accurate manner. During the rough grinding the operator can observe generally the progress of the grind and may even use the facet surfaces at this point to adjust the rough grinding cup generator mechanism so as not to vary too greatly from the correct final orientation. The grinding is then continued by a more accurate method such as by fine grinding with a hand lapping device common to the art and comprising a rotating spindle with a metal lap attached, and a tub surrounding the operating parts. A metal plate attached to the back of the major blank is equipped with a plurality of depressions one of which holds in universal relation the point of a reciprocable hand operated device. As the finish grinding progresses the point may be placed in another of the plurality of depressions so as to compensate for uneven progression of the grinding. During the finish grinding the facet surface 19 will approach the optically precise interface 21 and becomes a measure of the depth to which the final grind must be carried in order to exactly feather the edge of the interface. In other words, it is desired to maintain the proper width of the minor lens in the multifocal assembly in addition to having the surfaces and interfaces thereof formed to optical perfection. The cross section of the partially ground assembly appears as at Fig. 12 with the facet interface clearly visible. Just as the facet surface disappears the grinding is complete and the appearance of the multifocal lens is as at Fig. 13 with the feathered lower edge appearing in cross section as at Fig. 14. It will be observed that the original fusion surface at the side wall 15 of the button carrier has been preserved to some degree at the upper edge 22 of the minor lens but that the lower edge 23 has become completely feathered so as to have no cliff or vertical wall. Since the outer optical surface and the interface are both continuous, multifocal blanks such as a tri-focal lens may be produced by substituting a segment button as in Fig. 16 having a glass composition at the top 22 with a refractive index intermediate that of the major blank 10 and the lower part 23 of the button.

Where more than one facet surface 19 is employed the combination of the disappearing surfaces thereof may be used for adjusting the orientation of the intermediate product while being ground to the finished multifocal blank. Thus if either of the facet surfaces 19 in the partially ground blank appearing in Fig. 11 were to show a more rapid diminution it would indicate to the operator that the grinding mechanism was not properly aligned. Such misalignment would not of necessity indicate that the precision of the optical formula had been destroyed, it would merely indicate that the orientation of the entire precise surface was in error. Adjusting the orientation of the grinding mechanism relative to the intermediate product can thus be effected so as to cause the facet surfaces 19 to disappear simultaneously. Any one of such facet surfaces will indicate the finished depth to which the grind must be taken. Any two of such disappearing facet surfaces will indicate misalignment of the grinding apparatus in a plane therethrough and three disappearing facet surfaces would indicate the complete adjustment of the mechanism in order to maintain the exact depth of grinding and the precise distances between the optically precise surfaces and interfaces. In practice we find that two facet surfaces as shown in Fig. 11 will give us adequate control since we have provided sufficient thickness in the original major blank to allow for any slight misalignment in a plane vertical and normal to the minor lens as shown in Fig. 11. In order to have a clear visual understanding of the differential between depths of the facet surfaces 19 we prefer that the sides thereof taper toward the bottom of the recess 14 as shown in Fig. 2. Thus the actual area or peripheral dimensions of the facet interface will become greater as the grinding nears completion, but just at completion the facet surface rapidly diminishes and becomes a highly sensitive means of determining the exact depth reached. While more than two facet surfaces 19 are employed, as for example three, the appearance of the button carrier is as shown in Fig. 15.

It may thus be seen that we have devised a novel method of forming precise multifocal blanks with a minimum of effort during the manufacture thereof. The progress of the grinding may be visually observed without resorting to calibration devices and numerous and bothersome interruptions of the process. In addition to this, our new method results in a product having a minor lens with a peripheral outline and segment shape such that it is highly efficient and useful to the wearer. The straight top edge allows a convenient shifting of the line of sight from a lower to an upper position and vice versa while still maintaining a maximum useful area without the minor lens. The union of the lower curved feather edge with the upper straight line forms rounded corners which are designed to conform to projected eye sight through the curved pupil of the eyeball.

It will, of course, be understood that various changes may be made in the form, details, arrangement and proportions of the parts without departing from the scope of our invention.

What we claim is:

1. In the manufacture of a multifocal semifinished lens blank the method which consists in grinding to precise formula a lens surface in a face of a major blank of optical material having a first index of refraction, making from a block of heat-softened optical material with substantially the same first index of refraction a unitary button carrier by pressing medially into a surface area thereof a recess having a smooth and well-defined side wall, forming in a relatively small area transverse to the length of said side wall a plurality of tapering facet surfaces increasing in area from adjacent the bottom of said recess upwardly to the surface of said button carrier, placing in said recess within the unitary button carrier a segment button of optical material having a second index of refraction and being of substantially the same dimensions and configuration as said recess, fusing said segment button to the button carrier within said recess to form a minor blank, grinding the minor blank at the composite exposed surfaces of said fused button carrier and segment button with said same precise formula and to a depth intermediate the length of each of said tapering facet surfaces, bringing said precisely ground surfaces together in fused relation, grinding to a second precise formula the composite surfaces of the major and minor blanks to increase the size of said facet at its edge of intersection with the surface being ground until each facet acquires its maximum dimension at said intersecting edge, and finally finishing said grinding according to said second precise formula until the facet outline just disappears.

2. As a new intermediate article of manufacture in the making of a multifocal lens the combination of a major optical blank having a raised boss upon the surface thereof, said boss having a refractive index the same as the remainder of said major optical blank, a piece of optical material completely imbedded within said boss, said imbedded material having a refractive index different from that of said major blank, and forming with said major blank an optically precise interface therebetween, a plurality of converging facets extending precisely from the plane of said interface and diminishing outwardly toward the surface of said boss, whereby said article of manufacture may be ground to remove all outward vestige of said boss and further optically ground into the surface of said major blank and said imbedded piece of optical material to a predetermined depth as signified by the size of said tapering facets and ultimately by the simultaneous disappearance of said facet surfaces.

References Cited in the file of this patent

UNITED STATES PATENTS

| | | |
|---|---|---|
| 1,911,806 | Clement | May 30, 1933 |
| 2,112,659 | Reh | Mar. 29, 1938 |